United States Patent [19]
Prucnal et al.

[11] Patent Number: 5,744,522
[45] Date of Patent: Apr. 28, 1998

[54] LOW GLOSS COATING COMPOSITIONS

[75] Inventors: Paul J. Prucnal, Pittsburgh, Pa.; Szu-Ping Lu, Canton, Mich.

[73] Assignee: Mitsui Toatsu Chemicals, Inc., Tokyo, Japan

[21] Appl. No.: 713,517

[22] Filed: Sep. 13, 1996

[51] Int. Cl.$^6$ .............................. C08L 63/00; C08F 20/00
[52] U.S. Cl. .................. 523/442; 523/443; 523/505; 523/512; 525/127; 525/131; 525/165; 525/438; 525/454; 525/528; 525/533
[58] Field of Search .................................. 525/127, 131, 525/165, 438, 454, 528, 533; 523/505, 512, 442, 443

[56] References Cited

U.S. PATENT DOCUMENTS

| | | | |
|---|---|---|---|
| 3,485,833 | 12/1969 | Sadle | 260/248 |
| 4,027,066 | 5/1977 | Victorius | 428/334 |
| 4,066,613 | 1/1978 | Peng | 260/42.54 |
| 4,091,049 | 5/1978 | Labana et al. | 260/836 |
| 4,137,277 | 1/1979 | Nordstrom et al. | 260/835 |
| 4,211,691 | 7/1980 | Fitzgerald | 260/42.21 |
| 4,388,448 | 6/1983 | Melby | 525/327.3 |
| 4,419,495 | 12/1983 | Davis | 525/109 |
| 4,835,228 | 5/1989 | Hefner et al. | 525/524 |
| 4,942,215 | 7/1990 | Greco et al. | 528/114 |
| 5,006,612 | 4/1991 | Danick et al. | 525/438 |
| 5,212,243 | 5/1993 | Toyoda et al. | 525/187 |
| 5,380,804 | 1/1995 | Lees et al. | 525/327.3 |
| 5,407,706 | 4/1995 | Kano et al. | 427/386 |
| 5,436,311 | 7/1995 | Hoebeke et al. | 525/174 |

FOREIGN PATENT DOCUMENTS

| | | |
|---|---|---|
| 220637 | 5/1987 | European Pat. Off. . |
| 503865 | 9/1992 | European Pat. Off. . |
| 503866 | 9/1992 | European Pat. Off. . |
| 480120 | 11/1995 | European Pat. Off. . |

OTHER PUBLICATIONS

K. Dill, "Taking the Plunge into Powder", 34, (3), May–Jun. 1993, pp. 39–41 *Abstract Only*.

*Primary Examiner*—Randy Gulakowski
*Attorney, Agent, or Firm*—Burns, Doane, Swecker & Mathis

[57] ABSTRACT

A low gloss coating composition having a 60° gloss of less than about 60 which contains:

a) a glycidyl group-containing acrylic copolymer;
b) an aromatic polyester; and
c) an isocyanurate curing agent having the formula:

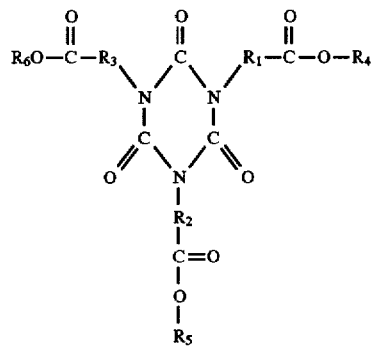

wherein $R_1$–$R_3$ are independently selected from the group consisting of divalent alkylene groups of 1 to 18 carbon atoms and divalent groups of 3 to 21 carbon atoms and containing an ester linkage, and $R_4$–$R_6$ are independently selected from the group consisting of H, organic salt groups, alkyl groups of 1 to 20 carbon atoms and C(O)$R_7$, wherein $R_7$ is an alkyl group of 1 to 22 carbon atoms.

30 Claims, No Drawings

LOW GLOSS COATING COMPOSITIONS

BACKGROUND OF THE INVENTION

1. Field of the Invention

The present invention relates to coating compositions which exhibit low gloss upon curing. In one aspect, the present invention relates to coating compositions which exhibit dead flat characteristics upon curing.

2. Description of the Related Art

Coating compositions have long been used to provide the surface of articles with desired characteristics. For instance, coating compositions have been used to protect surfaces from the environment, to conceal surface irregularities, to provide articles with a different appearance or to provide a surface which is more conducive to further treatment. In the past, many coating compositions relied on a liquid carrier which evaporated after the composition was applied to the surface. However, due to environmental and health concerns, as well as for performance reasons, the trend in the art has been to solventless systems, particularly in the automotive industry.

In some instances, it is desired to have the coating composition impart a high gloss to the coated surface. For example, U.S. Pat. No. 5,407,706 notes that Japanese Patent Application (OPI) Nos. 47456/1974, 53239/1974, 125109/1976 and 136856/1981 all describe high gloss coatings prepared from a powder composition comprising a polyester resin having carboxyl groups and an acrylic resin having glycidyl groups in the molecule.

Another powder composition that is said to provide high gloss, as well as exceptional solvent resistance and hardness upon curing is U.S. Pat. No. 5,380,804. The curable composition comprises (i) 1,3,5-tris-(2-carboxyethyl) isocyanurate as a cross-linker, (ii) a polyepoxide which is preferably a low molecular weight copolymer of epoxy group-containing monomers, such as glycidyl acrylate, glycidyl methacrylate or a mixture thereof with one or more epoxy-free olefinically-unsaturated monomers, such as an acrylic ester, and (iii) an optional cure catalyst.

Low gloss compositions have also been developed in the art. For instance, U.S. Pat. No. 5,436,311 describes a powder thermosetting composition comprising as the binder a mixture of a linear carboxyl group-containing polyester and a glycidyl group-containing acrylic copolymer. The polyester has an acid number of 20 to 50 mg KOH/g. The acrylic copolymer has a number average molecular weight of from 4,000 to 10,000 and is obtained from 5 to 30% by weight glycidyl acrylate or glycidyl methacrylate and 70 to 95% by weight of methyl methacrylate whereby up to 25% by weight of the methyl methacrylate can be replaced by another vinyl monomer.

Aforementioned U.S. Pat. No. 5,407,706 also describes a powder coating composition which provides low gloss upon curing. The composition comprises (A) a resin comprising from 10 to 90 weight % of an acrylic resin having a viscosity of 100 to 800 poises at 140° C. that is obtained by polymerizing 10 to 50 weight % of glycidyl acrylate or glycidyl methacrylate with 90 to 50 weight % of a copolymerizable monomer and 90 to 10 weight % of a further acrylic resin having a viscosity of 1,000 to 5,000 poises at 140° C. that is prepared from defined comonomers, and (B) a polybasic acid compound having a viscosity of 100 to 2,000 poises at 140° C. The equivalent ratio of the glycidyl groups to the acid groups of the polybasic acid compound may be from 1.5 to 0.5.

Another low gloss composition is described in published European Application No. 220637. The composition is comprised of the product resulting from the polymerization in the presence of a catalytic quantity of suitable polymerization catalyst, (A) the reaction product of (1) a diglycidyl ether of a dihydric phenol having an epoxide equivalent weight of from 111 to 350 with (2) a compound containing a group reactive with an epoxide group and a polymerizable ethylenically unsaturated group in defined amounts with (B) a monomer feed containing (1) at least one vinyl aromatic monomer in a defined amount, (2) a compound containing a group reactive with an epoxide group and a polymerizable ethylenically unsaturated group in a defined amount and, optionally, (3) a hydroxyalkyl acrylate or methacrylate in a defined amount. A further epoxy resin-based low gloss coating material is described in U.S. Pat. No. 4,835,228.

In U.S. Pat. No. 4,419,495, a low gloss epoxy resin powder coating is obtained by employing a polymer of two or more polymerizable ethylenically unsaturated monomers, at least one of which contains a group which is reactive with a vicinal epoxy group, as a curing agent.

U.S. Pat. No. 4,137,277 describes a powder paint which comprises a particulate mixture of difunctional copolymer containing, among other components, a defined amount of a glycidyl ester of a monoethylenically unsaturated acid and a carboxy-functional crosslinking agent which is a carboxy-terminated compound selected from the group consisting of esters of a diepoxide and a dicarboxylic acid and carboxy-terminated saturated polyesters.

A further powder coating composition containing a glycidyl compound and a carboxyl-terminated crosslinking agent is set forth in U.S. Pat. No. 4,091,049. One carboxyl-terminated curing agent for glycidyl acrylic material that is commercially available from E. I. DuPont de Nemours & Co. is 1, 12-dodecanedioic acid.

Although low gloss coatings have been achieved by certain compositions in the art, it has been difficult to obtain very low gloss coatings that exhibit isotropic gloss characteristics on a reproducible basis and which can withstand variations in additives without requiring reformulation.

SUMMARY OF THE INVENTION

According to one aspect, the present invention provides a coating composition that exhibits a 60° gloss of less than about 60 upon curing. The composition comprises:

a) a glycidyl group-containing acrylic copolymer;

b) an aromatic polyester; and c) an isocyanurate curing agent having the formula:

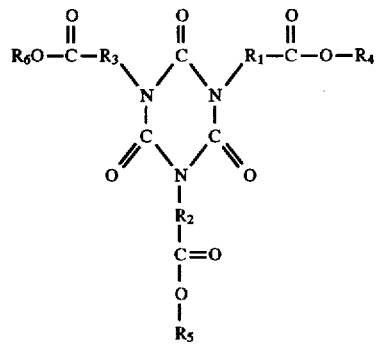

wherein $R_1$–$R_3$ are independently selected from the group consisting of divalent alkylene groups of 1 to 18 carbon atoms and divalent groups of 3 to 21 carbon atoms and containing an ester linkage, and $R_4$–$R_6$ are independently selected from the group consisting of H, organic salt groups, alkyl groups of 1 to 20 carbon atoms and $C(O)R_7$ wherein $R_7$ is an alkyl group of 1 to 22 carbon atoms.

In a further aspect, the present invention provides a coating composition that exhibits a 60° gloss of less than about 60 upon curing. The composition comprises:

a) a glycidyl group-containing acrylic copolymer;

b) an aromatic polyester;

c) an isocyanurate curing agent having the formula:

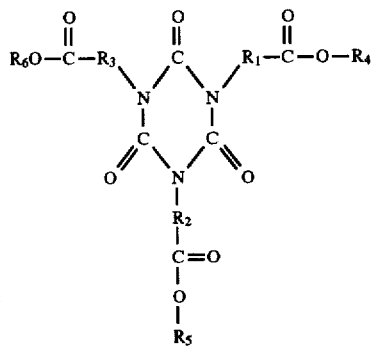

wherein $R_1$–$R_3$ are independently selected from the group consisting of divalent alkylene groups of 1 to 18 carbon atoms and divalent groups of 3 to 21 carbon atoms and containing an ester linkage, and $R_4$–$R_6$ are independently selected from the group consisting of H, organic salt groups, alkyl groups of 1 to 20 carbon atoms and $C(O)R_7$ wherein $R_7$ is an alkyl group of 1 to 22 carbon atoms;

d) an acidic acrylic compound; and e) pigment.

DESCRIPTION OF THE PREFERRED EMBODIMENTS

As noted above, one aspect of the present invention relates to a coating composition that provides a 60° gloss of less than about 60, preferably less than about 50, more preferably less than about 30 upon curing comprising:

a) a glycidyl group-containing acrylic copolymer;

b) an aromatic polyester; and c) an isocyanurate curing agent having the formula:

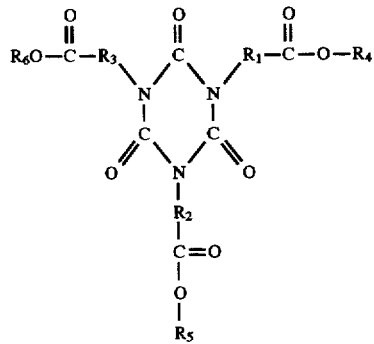

wherein $R_1$–$R_3$ are independently selected from the group consisting of divalent alkylene groups of 1 to 18 carbon atoms and divalent groups of 3 to 21 carbon atoms and containing an ester linkage, and $R_4$–$R_6$ are independently selected from the group consisting of H, organic salt groups, alkyl groups of 1 to 20 carbon atoms and $C(O)R_7$ wherein $R_7$ is an alkyl group of 1 to 22 carbon atoms.

The glycidyl group-containing acrylic copolymer can be prepared by reacting one or more compounds of formula (I) with one or more ethylenically unsaturated compounds copolymerizable therewith. Formula (I) is set forth as follows:

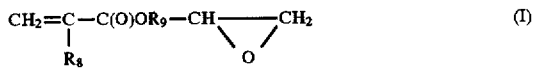

wherein $R_8$ represents H or an alkyl group containing from 1 to 4 carbon atoms and $R_9$ represents a branched or unbranched alkyl group containing from 1 to 20 carbon atoms. Illustrative compounds within the definition of formula (I) are glycidyl acrylate, glycidyl methacrylate, and 1,2-epoxybutylacrylate.

The ethylenically unsaturated compound copolymerizable with the compound of formula (I) can be alkyl esters of acrylic acid or methacrylic acid such as methyl acrylate, ethyl acrylate, normal butyl acrylate, isobutyl acrylate, 2-ethylhexyl acrylate, cyclohexyl acrylate, isobornylacrylate, methyl methacrylate, ethyl methacrylate, normal butyl methacrylate, isobutyl methacrylate, 2-ethylhexylmethacrylate, lauryl methacrylate, tridecyl methacrylate, stearyl methacrylate, cyclohexyl methacrylate and isobornyl methacrylate; vinyl monomers such as styrene, vinyltoluene, α-methylstyrene; acrylonitriles, such as acrylonitrile and methacrylonitrile; acrylamides, such as acrylamide and dimethylacrylamide; hydroxyalkyl esters of acrylic acid and methacrylic acid, such as hydroxyethyl acrylate, hydroxypropyl acrylate, hydroxyethyl methacrylate, and hydroxypropyl methacrylate; and dialkyl esters of unsaturated dibasic acids. As mentioned above, the ethylenically unsaturated compound copolymerizable with the compound of formula (I) can also be mixtures of the aforementioned compounds.

The amount of the compound of formula (I) is from about 10 to about 65% by weight, preferably from about 20 to about 50% by weight of the total amount of monomers used to prepare the glycidyl group-containing acrylic copolymer. The amount of the ethylenically unsaturated compound copolymerizable with the compound of formula (I) is from about 35 to about 90% by weight, preferably from about 50 to about 80% by weight of the total amount of monomers used to prepare the glycidyl group-containing acrylic copolymer.

The glycidyl group-containing acrylic copolymer has a weight average molecular weight of from about 3,000 to about 200,000, preferably from about 3,000 to about 20,000 as determined by gel permeation chromatography relative to polystyrene standards. Higher molecular weights tend to provide copolymers with higher melt viscosities which are less preferable. In this respect, it is desirable to use a glycidyl group-containing acrylic copolymer or a mixture of two or more copolymers having a melt viscosity of from about 10 to about 500 poise, preferably from about 30 to about 300 poise at 150° C. as determined by an ICI Cone and Plate Viscometer.

The glycidyl group-containing acrylic copolymer can be prepared under reaction conditions known in the art. For instance, the monomers can be added to an organic solvent such as xylene and the reaction conducted with reflux in the presence of an initiator such as azobisisobutyronitrile or benzoyl peroxide. Illustrative conditions are set forth in U.S. Pat. Nos. 5,407,706 and 5,436,311, the contents of which are incorporated by reference in their entirety. In addition, various glycidyl group-containing acrylic copolymers are commercially available such as under the trademark "ALMATEX" from Anderson Development Company of Adrian, Mich.

The glycidyl group-containing acrylic copolymer is present in the coating composition in an amount ranging from about 20 to about 80% by weight of the composition, preferably from about 25 to about 65% by weight. As noted above, mixtures of glycidyl group-containing acrylic copolymers may also be used. Unless otherwise stated, the weight of the composition does not include any pigments that may be present.

The aromatic polyester contains carboxyl groups and typically has an acid number of from about 10 to about 300 mg KOH/g, preferably from about 20 to about 150 mg KOH/g. In the context of the present invention, the acid number is determined by DIN 53402 as described in U.S. Pat. No. 5,436,311. The aromatic polyester has a weight average molecular weight of from about 2,000 to about 20,000, preferably from about 3,000 to about 12,000 as determined by gel permeation chromatography. As is the case for the glycidyl group-containing acrylic copolymer, higher molecular weights tend to provide polymers with higher melt viscosities which are less preferable. In this respect, it is desirable to use an aromatic polyester or mixture of polyesters having a melt viscosity of from about 5 to about 100 poise, preferably from about 10 to about 50 poise at 200° C. as determined by an ICI Cone and Plate Viscometer.

The aromatic polyester can be prepared by reacting an aromatic polycarboxylic acid and/or anhydride and a polyhydroxy compound. Suitable aromatic polycarboxylic acids include terephthalic acid, isophthalic acid, phthalic acid, phthalic anhydride, naphthalenedicarboxylic acid, trimellitic acid, trimellitic anhydride, pyromellitic acid and pyromellitic dianhydride and hydroxycarboxylic acids such as parahydroxybenzoic acid. Preferred aromatic polycarboxylic acids include terephthalic acid and isophthalic acid. Mixtures of these acids and anhydrides can also be used.

Up to about 50 mole % of the aromatic polycarboxylic acid used to prepare the aromatic polyester can be replaced with non-aromatic polyvalent carboxylic acids, such as 1,4-cyclohexanedicarboxylic acid or adipic acid. Other non-aromatic polycarboxylic acids which can be used are aliphatic carboxylic acids such as succinic acid, glutaric acid, pimelic acid, suberic acid, azelaic acid, sebacic acid, 1,9-nonanedicarboxylic acid, 1,10-decanedicarboxylic acid, eicosanedicarboxylic acid, maleic acid, maleic anhydride, fumaric acid, hexahydrophthalic acid, hexahydrophthalic anhydride, and 3,6-endo-methylene-$\Delta^4$-tetrahydrophthalic anhydride and hydroxycarboxylic acids, for example, malic acid, tartaric acid, and 12-hydroxystearic acid. Mixtures of these compounds can also be used.

The polyhydroxy compound can be for example, ethylene glycol, diethylene glycol, triethylene glycol, 1,2-propanediol, 1,3-propanediol, 1,3-butanediol, 1,4-butanediol, 1,5-pentanediol, 1,6-hexanediol, 1,9-nonanediol, 1,10-decanediol, neopentyl glycol, spiroglycol, 1,4-cyclohexanedimethanol, 2,2,4-trimethylpentane-1,3-diol, trimethylolethane, trimethylolpropane, glycerin, pentaerythritol, hydrogenated bisphenol A, and adducts of hydrogenated bisphenol A with ethylene oxide or propylene oxide can be used. Aromatic polyhydroxy compounds, such as dihydroxy benzene, dihydroxy naphthalene, bisphenol A, hydroquinone dihydroxyethylether (available from Eastman Chemical Co.) and hydroxyethylated bisphenol A (available from Akzo Chemical Co.) can also be used, but are less preferred. Mixtures of the polyhydroxy compounds can also be used to prepare the aromatic polyester. As polyhydroxy compounds, a polyhydric alcohol having 2 to 6 hydroxyl groups and adducts of bisphenol A or hydrogenated bisphenol A with alkylene oxides are preferable. Among these compounds, ethylene glycol, neopentyl glycol and 1,4-butanediol are more preferable.

The ratio of the polycarboxylic acid and/or anhydride to the polyhydroxy compound is selected so that the aromatic polyester has an acid number of from about 10 to about 300 mg KOH/g, preferably from about 20 to about 150 mg KOH/g as determined by DIN 53402 as described in U.S. Pat. No. 5,436,311. While not preferred, it is possible to prepare at least a portion of the aromatic polyester from at least one hydroxycarboxylic acid. In addition, tri- and higher functional materials can be used so that the average functionality can be greater than about 3.0 provided that the viscosity of the aromatic polyester does not prevent flow-out of the coating composition.

The aromatic polyester may be prepared by techniques well known in the art, such as that described in aforementioned U.S. Pat. No. 5,407,706, the contents of which have been previously incorporated by reference. In addition, suitable aromatic polyesters are available commercially such as from Anderson Development Company of Adrian, Mich. or Nippon Ester Company in Japan.

The aromatic polyester is present in the coating composition in an amount ranging from about 20 to about 80% by weight of the composition, preferably from about 40 to about 75% by weight (excluding the weight of any pigment). Mixtures of aromatic polyesters may also be used. To improve the outdoor durability and impact resistance of the cured composition, a portion of the aromatic polyester can be replaced with one or more aliphatic polyesters that can be prepared from an aliphatic polycarboxylic acid or anhydride and a polyhydroxy compound and are also commercially available such as from Anderson Developing Company of Adrian, Mich. under the designation AP 8500. Although the precise amount will vary from one composition to the next, up to about 15–30% of the reactive (carboxylic acid) equivalents of the aromatic polyester (and occasionally more) can be replaced with an aliphatic polyester (such as those that are commercially available) to improve outdoor durability and impact resistance without substantially adversely affecting the low gloss level.

The isocyanurate curing agent has the formula:

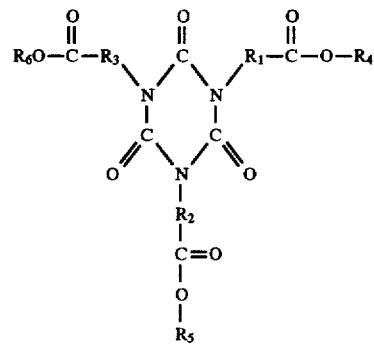

wherein $R_1$–$R_3$ are independently selected from the group consisting of divalent alkylene groups of 1 to 18 carbon atoms and divalent groups of 3 to 21 carbon atoms and containing an ester linkage, and $R_4$–$R_6$ are independently selected from the group consisting of H, organic salt groups, alkyl groups of 1 to 20 carbon atoms and $C(O)R_7$ wherein $R_7$ is an alkyl group of 1 to 22 carbon atoms.

The isocyanurate curing agent is present in the coating composition in an amount ranging from about 1 to about 30% by weight of the coating composition (excluding any pigment) preferably from about 3 to about 15% by weight of the coating composition (excluding any pigment). Mixtures of the isocyanurate curing agent may also be used.

From the foregoing formula, it can be understood that the isocyanurate curing agent can be 1,3,5-tris-(2-carboxyethyl) isocyanurate which is used in the high gloss composition described in aforementioned U.S. Pat. No. 5,380,804, the contents of which are incorporated by reference. As described therein, the 1,3,5-tris-(2-carboxyethyl) isocyanurate can be prepared by the reaction of cyanuric acid and acrylonitrile as set forth in U.S. Pat. Nos. 3,485,833 and 3,235,553, the contents of which are also incorporated by reference. In addition, 1,3,5-tris-(2-carboxyethyl) isocyanurate is available from Cytec Industries Inc. of Stamford, Conn.

Additional tricarboxylic isocyanurate curing agents within the above formula include 1,3,5-tris-(2-carboxypropyl) isocyanurate, 1,3,5-tris-(2-carboxybutyl) isocyanurate, which can be prepared by techniques known in the art.

A salt of carboxy-terminated isocyanurate compounds can be prepared to obtain a curing agent with a melting point lower than the corresponding tricarboxylic isocyanurate compound. For instance, 1,3,5-tris-(2-carboxyethyl) isocyanurate has a melting point of 225° C. while the organic salt formed by reacting one of the carboxyl groups with N,N-dimethyldodecylamine has a melting point of 103° C. The lower melting point improves the effectiveness of the isocyanurate curing agent at conventional curing temperatures of from about 145° to about 185° C.

To form the organic salt of the isocyanurate curing agent, the tricarboxylic isocyanurate compound can be reacted with any known compound capable of forming an organic salt. For instance, the compound can be an amine, preferably a tertiary amine, such as N,N-dimethyldodecylamine, N,N-dimethylethanolamine, tributylamine and similar compounds. Alternatively, compounds such as imidazoles and N-alkyl derivatives of imidazoles may be used to form the organic salt. The organic salt of the isocyanurate curing agent can be prepared by any suitable technique. For instance, the tricarboxylic isocyanurate compound can be dissolved into an appropriate solvent, such as methanol, at an elevated temperature. The tertiary amine can be dropwise added to the reaction mixture and upon completion thereof, the solvent can be evaporated to dryness and the organic salt then recovered. While all three of the carboxylic acid groups can be converted to the salt form, generally the ratio of the tricarboxylic isocyanurate and the salt group forming compound is selected so that on average two carboxyl groups remain.

To obtain a lower melting point isocyanurate curing agent, one can also use a compound wherein one or more of $R_1$–$R_3$ are divalent groups of 3 to 21 carbon atoms and contain an ester linkage between the isocyanurate ring and the carboxyl group, organic salt group or $C(O)OC(O)R_7$ group. This type of compound can be prepared by the reaction of a hydroxy-terminated isocyanurate compound and a carboxylic anhydride. For instance, when the hydroxy-terminated isocyanurate compound is 1,3,5-tris-(2-hydroxyethyl) isocyanurate and the carboxylic anhydride is succinic anhydride and all of the hydroxy groups are reacted with the succinic anhydride, an isocyanurate curing agent is obtained with an initial melting point of 90° C. that can be referred to as tris(3-carboxy-1-yl-propoxyethyl)1,3,5-triazine-2,4,6-(1H,3H,5H) trione. The reaction can be illustrated as follows:

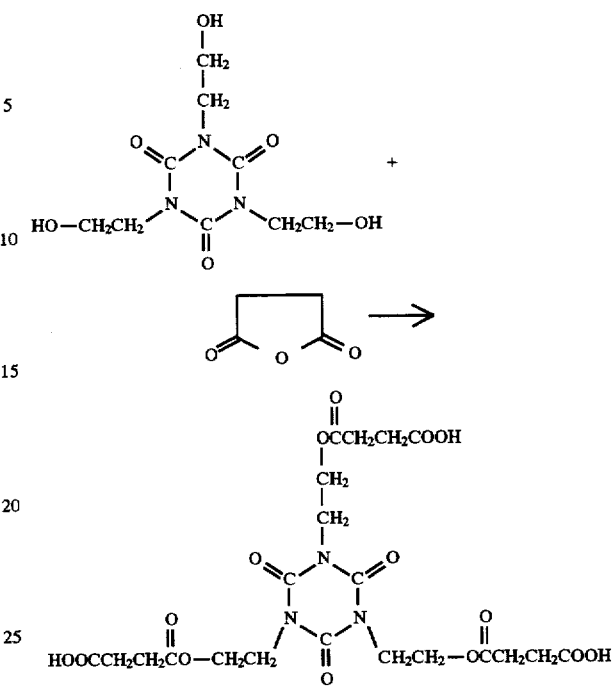

Other suitable hydroxy-terminated isocyanurate compounds which can be used to prepare this form of the isocyanurate curing agent include 1,3,5-tris(4-hydroxybutyl) isocyanurate. The hydroxy-terminated isocyanurate compound can be prepared by an appropriate technique and is also commercially available such as from BASF Corp.

Other suitable acid anhydrides that can be reacted with the hydroxy-terminated isocyanurate compound include other cyclic anhydrides, such as hexahydrophthalic anhydride and tetrahydrophthalic anhydride, acyclic anhydrides, such as 1,12-dodecanedioic acid polyanhydride (commercially available as Additol VXL 1384 from Hoechst) and aromatic anhydrides, such as phthalic anhydride. Further possible anhydrides include polysebacic acid anhydride and polyazelaic anhydride (which are also commercially available). The reaction of linear polyanhydrides with the hydroxy-terminated isocyanate compound typically yields a mixture of the desired product and a diacid. The mixture may often be used as such or purified by removal of the by-product diacid.

While saturated cyclic anhydrides are generally preferred, unsaturated anhydrides, such as maleic anhydride and 5-norbornene-2,3-dicarboxylic anhydride, might be useful in certain instances. Additionally, while dicarboxylic acids could theoretically be used, they generally would be less preferred due to the proliferation of possible by-products. Similarly, one could theoretically prepare the ester group-containing isocyanurate curing agent by reacting an acid-terminated isocyanurate compound, such as 1,3,5-tris-(2-carboxyethyl) isocyanurate, with a hydroxycarboxylic acid, such as lactic acid or glycolic acid or their cyclic dimers or 4-hydroxybutyric acid, but this technique is generally less preferred due to the proliferation of possible by-products.

Mixtures of the various reactants can also be used to prepare the isocyanurate curing agent. In all instances, the resulting isocyanurate curing agent must be reactive with other components of the coating composition to obtain the desired low level of gloss and preferably exhibits a melting point lower than about 220° C., more preferably less than 185° C. and even more preferably less than 145° C.

The reaction between the hydroxy-terminated isocyanurate compound and the acid anhydride can be conducted by dissolving the hydroxy-terminated isocyanurate compound into a suitable solvent such as acetonitrile at an elevated temperature. The acid anhydride is added to the reaction mixture and kept under reflux conditions for a suitable time which is approximately six hours for the reaction illustrated above. The ratio of the reactants is selected so that on average at least 95% preferably at least 99% of the hydroxyl groups are reacted with the acid anhydride. The solvent is evaporated under vacuum and the crude product is dissolved in an appropriate solvent, such as ethylacetate, for recrystallization. The product can be analyzed by FT-IR for anhydride peaks and the melting point can be determined by a Differential Scanning Calorimeter.

To prepare an isocyanurate curing agent having one or more $C(O)R_7$ groups, various techniques can be used. For instance, a carboxyl-terminated isocyanurate compound, as described above, can be reacted with a basic compound, such as NaOH, to form the inorganic salt of the acid group. This salt compound can then be reacted with an acyl halide compound to provide the terminal $C(O)R_7$ group(s). When the starting material is 1,3,5-tris-(carboxyethyl)isocyanurate and all of the carboxyl groups are reacted, the reaction procedure can be illustrated as follows:

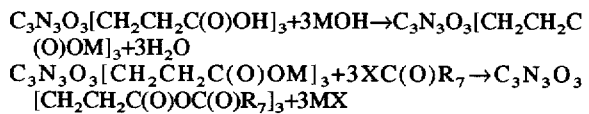

$C_3N_3O_3[CH_2CH_2C(O)OH]_3 + 3MOH \rightarrow C_3N_3O_3[CH_2CH_2C(O)OM]_3 + 3H_2O$ $C_3N_3O_3[CH_2CH_2C(O)OM]_3 + 3XC(O)R_7 \rightarrow C_3N_3O_3[CH_2CH_2C(O)OC(O)R_7]_3 + 3MX$ In the reaction, M is a monovalent metal, particularly an alkali metal, preferably Na, and X is a halogen, preferably Cl.

It should be apparent that this technique can also be applied to an isocyanurate curing agent wherein one or more of the $R_1$–$R_3$ groups contains an ester group. In this embodiment, one could start with a hydroxy-terminated isocyanurate compound which is reacted with a carboxylic anhydride in the manner previously described. The carboxy-terminated isocyanurate compound could then be subjected to the reaction procedure described above to attain acylation of one or more of the terminal carboxy groups. For instance, 1,3,5-tris-(2-hydroxyethyl)isocyanurate can be reacted with succinic anhydride that is next reacted with the MOH compound and the product thereof then reacted with the $XC(O)R_7$ compound. This reaction would have the following sequence if all of the carboxyl groups are reacted:

$C_3N_3O_3[CH_2CH_2OC(O)CH_2CH_2C(O)OH]_3 + 3MOH \rightarrow$
$C_3N_3O_3[CH_2CH_2OC(O)CH_2CH_2C(O)OM]_3 + 3H_2O$
$C_3N_3O_3[CH_2CH_2OC(O)CH_2CH_2C(O)OM]_3 + 3XC(O)R_7 \rightarrow$
$C_3N_3O_3[CH_2CH_2OC(O)CH_2CH_2C(O)OC(O)R_7]_3 + 3MX$ The conditions used to react the carboxy-terminated isocyanurate compound with the basic compound and the thus prepared inorganic salt with the acyl halide compound can be readily determined by those of ordinary skill in the art.

If $R_7$ is $CH_3$, this form of the isocyanurate curing agent can also be prepared by reacting a carboxy-terminated isocyanurate compound with ketene (i.e., $CH_2$=$C(O)$) or acetic anhydride under conditions that can be readily determined by those skilled in the art. The ketene used in the reaction can be generated by the pyrolysis of ketene dimer at temperatures of about 450° C. When the starting material is 1,3,5-tris-(carboxyethyl)isocyanurate and all of the carboxyl groups are reacted, the reaction procedures can be illustrated as follows:

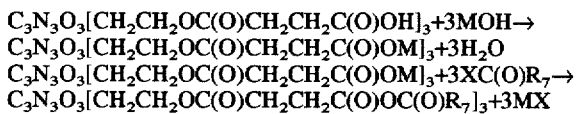

$C_3N_3O_3[CH_2CH_2C(O)OH]_3 + 3CH_2$=$C(O) \rightarrow C_3N_3O_3[CH_2CH_2C(O)OC(O)CH_3]_3$ $C_3N_3O_3[CH_2CH_2C(O)OH]_3 + 3CH_3C(O)OC(O)CH_3 \rightarrow C_3N_3O_3[CH_2CH_2C(O)OH_3]_3 + 3CH_3C(O)OH$ With respect to the latter reaction, higher acid anhydrides can be used, but form acid by-products that are more difficult to remove. Other techniques known to those skilled in the art for forming the acyl-terminated isocyanurate compounds can also be used. In this regard, when the triacyl-terminated isocyanurate compound is used as a curing agent, a basic catalyst, such as an amine, preferably a tertiary amine, is also added to the composition. Other known acid/epoxy reaction catalysts, such as alkyl imidazoles and tin compounds can similarly be used. By controlling the amount of this catalyst, one can control the speed of the curing reaction. In this respect, while one seeks to obtain a relatively fast reaction, sufficient time must be permitted to allow the composition to flow and thereby achieve the desired leveling so as to provide a uniform coating. As will be understood by those skilled in the art, the amount of the catalyst will depend on a variety of factors, such as the amounts and types of the reactive components, as well as the isocyanurate curing agent, and the curing conditions. However, a general range for the catalyst is from about 0.05 to about 5.0%, by weight of the coating composition (excluding the weight of any pigment) with the preferred range being from about 0.1 to about 2.0% by weight of the coating composition (excluding the weight of any pigment).

If desired, a small amount of a further material can be added to the coating composition to provide an additional curing function. For instance, as noted above, the unpurified reaction product of a hydroxy isocyanurate and a polyanhydride has a by-product of dicarboxylic acid which can provide further curing functionality while maintaining low gloss.

The compositions of the present invention can be used to provide clear coatings that do not contain pigments and still exhibit low gloss. However, in order to provide color and maintain low gloss, pigments can be added to the coating composition of the present invention. Pigments are generally present in an amount ranging from about 5 to about 60% by weight, preferably from about 15 to about 40% by weight of the total coating composition (i.e., including the pigment). In general, any conventional pigment can be used in the coating composition of the present invention and particularly useful pigments include inorganic materials, such as carbon black, titanium dioxide, barium sulfate, iron oxides, chromium oxide, talcs, clays, silica, and calcium carbonate and organic materials, such as phthalocyanines, benzimidazolones, quinacridones, dioxazines, isoindolinones, disazos, pyrazalones, diarylides, and dianisidines.

When pigments are present in the coating composition of the present invention, it is preferred to include a pigment dispersing agent which is preferably an acidic acrylic polymer. Such a material helps maintain pigment dispersion uniformity to maximize the hiding power of the pigment. The acidic acrylic polymer can be prepared by the copolymerization of acrylic or methacrylic acid with an ethylenically unsaturated compound, typically an acrylate or methacrylate ester, vinyl aromatic monomer, etc. Illustrative ethylenically unsaturated compounds are methylmethacrylate, n-butyl methacrylate, styrene, and 2-ethylhexylacrylate.

The reactants used to prepare the acidic acrylic polymer are selected so as to obtain an acid number of from about 10 to about 150 mg KOH/g, preferably from about 20 to about 100 mg KOH/g. Additionally, the acidic acrylic polymer has a weight molecular weight of from about 2,000 to about 20,000, preferably from about 3,000 to about 10,000 as determined by gel permeation chromatography.

The acidic acrylic polymer can be prepared according to conventional techniques and suitable acidic acrylic polymers are available commercially, such as from S. C. Johnson under the designations Joncryl SCX 815, 817 and 819. The acidic acrylic polymer is present in amount ranging from about 1 to about 15% preferably from about 1 to about 8% by weight of the composition (excluding the weight of pigment).

The coating composition of the present invention may also contain additives which are known in the art. For instance, an impact modifier, such as Rohm & Haas' KM 334, an epoxy resin for improving the corrosion resistance, benzoin for releasing air and other volatiles thereby suppressing the occurrence of bubbles in the coating, a catalyst for accelerating the curing reaction, such as a tertiary amine or an N-alkylimidazole, a flow control agent, such as a silicone compound or an acrylic compound (e.g., 2-ethylhexyl acrylate/ethylacrylate copolymer commercially available as a 65% acrylic on silica solid material designated Modaflow Powder III), an ultraviolet absorber, such as Tinuvin 900, a light stabilizer, such as a hindered amine compound (e.g., Tinuvin 144), an antistatic agent, and other materials may be blended in a range that does not substantially adversely affect the advantages of the present invention.

The coating composition can be prepared by selecting the proper amounts of the components of the composition and thoroughly premixing the components to form an essentially homogeneous mixture. Premixing may be achieved by any suitable means and an illustrative small scale mixer is a Vitamixer blender of the Vitamix Corporation in Cleveland, Ohio. The premixed components are then placed in a heated extruder where the mixture is melt mixed and extruded. One type of extruder that can be used is an APV Model 19 PC twin screw extruder with two individually adjustable heating zones with a variable rotation rate that can provide an extrudate in ribbon form from between a pair of chilled pinch rolls. The extruded composition is then crushed into powder form by any suitable means, such as a hammer mill (or a Vitamixer blender for small quantities) and powder passing through a 140 or 170 mesh sieve is collected. The powder can be packaged and used for coating various articles, such as automotive parts, industrial equipment, construction materials, outdoor furniture, etc.

To apply the coating composition to a surface, conventional techniques can be used so as to obtain a smooth, substantially uniform coating having a thickness that is generally from about 1.0 to about 10 mils, preferably from about 2.0 to about 4.0 mils. For instance, when the coating is to be applied to conductive substrates, such as steel articles (which have typically been pre-treated with iron or zinc phosphate), electrostatic spraying can be used. Spraying equipment is commercially available from manufacturers such as GEMA Volstatic of Indianapolis, Ind. and The Nordson Corp. of Amherst, Ohio. Previously treated surfaces can also be coated with the compositions of the present invention. For instance, a clear coating can be applied to a previously color coated surface to provide low gloss characteristics to the surface.

Curing is achieved by heating the coated surface for a time sufficient to cure the composition. Although the specific curing conditions depend on the precise constituents of the composition, including the presence or absence of a cure catalyst, typical cure conditions without the presence of a catalyst are from about 25 to about 30 minutes at about 165° C., about from about 15 to about 20 minutes at about 205° C. and about 40 minutes at about 135° C. As an illustration, typical curing conditions for a cured coating of 2.5 mils is 30 minutes at 165° C. and 30 minutes at 185° C.

By following the teachings of the present invention, one can obtain a coating composition that exhibits low gloss upon curing. In particular, the cured coating composition exhibits a 60° gloss of less than about 60, preferably less than about 50, and more preferably less than 30 as determined by ASTM D523 as described in U.S. Pat. No. 5,436,311.

The coating composition is especially valuable in obtaining compositions that exhibit "dead flat" characteristics upon curing which is indicated by a 60° gloss of from 0 to 10. Although not to be considered a limiting feature of the invention, it is believed that the composition achieves low gloss by a three-dimensional micro-wrinkling phenomenon that occurs because of a differential curing mechanism. The micro-wrinkled surface, which can only be observed under microscopic examination (e.g., about 200 magnification), disperses incident light and achieves this feature in an isotropic manner so that low gloss is achieved uniformly. This effect is to be contrasted with compositions that only provide a macroscopic wrinkling which can be observed by the naked eye. In addition, the coating composition provides highly reproducible results which is a significant improvement in the batch to batch variation that could be encountered with known low gloss formulations. Moreover, the coating composition of the present invention is tolerant to significant levels of coating additives (e.g., acid functional acrylics) without change in gloss that would require reformulation. This last feature has heretofore been difficult to achieve in low gloss compositions.

The cured compositions of the present invention also desirably exhibit good impact resistance which is an important factor for utilities such as automotive parts. Preferably, a surface coated with the cured composition exhibits a Gardner Impact Resistance of at least about 50 in-lbs, more preferably at least about 80 in-lbs. In addition, the cured composition desirably exhibits good outdoor durability, which is important for articles exposed to the environment, and good hardness with a pencil hardness value of H-B or F.

To illustrate the various aspects of the present invention, the following examples are provided. It is to be understood that the invention is not limited by the Examples. The following materials are used in the Control and illustrative Examples:

Acrylic Copolymer 1

A glycidyl group-containing copolymer comprised of glycidyl methacrylate, methyl methacrylate, butyl methacrylate and styrene having weight average molecular weight of approximately 7960, an epoxy equivalent of approximately 510 g/eq, a melt viscosity of approximately 41.0 poise at 180° C. (as determined by an ICI Cone & Plate Viscometer) and a glass transition temperature of approximately 43° to 46° C. that is commercially available from Anderson Development Company of Adrian, Mich.

Acrylic Copolymer 2

A glycidyl group-containing copolymer comprised of glycidyl methacrylate, methyl methacrylate, butyl acrylate and styrene having weight average molecular weight of approximately 11,000, an epoxy equivalent of approximately 512 g./eq, a melt viscosity of approximately 27 poise at 200° C. (as determined by an ICI Cone & Plate Viscometer) and a glass transition temperature of approximately 56°–58° C that is commercially available from Anderson Development Company of Adrian, Mich.

Acrylic Copolymer 3

A glycidyl group-containing copolymer comprised of glycidyl methacrylate, methyl methacrylate, butyl acrylate and styrene having weight average molecular weight of approximately 10,303, an epoxy equivalent of approximately 650 g/eq, a melt viscosity of approximately 190 poise at 150° C. (as determined by an ICI Cone & Plate Viscometer) and a glass transition temperature of approximately 45°–48° C.

Acrylic Copolymer 4

A glycidyl group-containing copolymer comprised of glycidyl methacrylate, methyl methacrylate, butyl methacrylate and styrene having a weight average molecular weight of approximately 7715, an epoxy equivalent of approximately 250 g/eq, a melt viscosity of approximately 54 poise at 150° C. (as determined by an ICI Cone & Plate Viscometer) and a glass transition temperature of approximately 45° C.

Aromatic Polyester

A polyester comprised of terephthalic acid, isophthalic acid, ethylene glycol and neopentyl glycol having a weight average molecular weight of approximately 5550, an acid number of approximately 45 and a melt viscosity at 200° C. of approximately 1550 cps.

Aliphatic Polyester

A commercially available polyester having an acid number of approximately 54–58, a hydroxyl number less than 3.0, a maximum APHA color of 50, a specific gravity at 25° C. of 1.162, a melting point (as determined by a Differential Scanning Calorimeter) of approximately 102° C., and a melt viscosity of approximately 2400–2700 cps at 100° C. (as determined by an ICI Cone & Plate Viscometer).

CEI 1,3,5-Tris(2-carboxyethyl)isocyanurate commercially available from Cytec Industries, Inc. of Stamford, Conn.

CEI-Salt

Prepared by dissolving 90.51 grams of CEI in 400 ml of methanol at a temperature of 65° C. To the solution is dropwise added 56.07 grams of N,N-dimethyldodecylamine. The methanol is evaporated, the solidified wax-like product is collected and dried overnight to obtain a product that exhibits an initial melting point of 93° C.

THEI-SUC

Reaction product of tris(hydroxyethylisocyanurate) (THEI) available from BASF Corp. and succinic anhydride (SUC) that is prepared by dissolving 131.9 grams of THEI into 280 grams of acetonitrile at 70° C. Into the solution is added 150.15 grams of SUC and the reaction is kept under reflux conditions for 6 hours. The solvent is stripped at 110°–120° C., 2 mmHg for 40 minutes. The product is dissolved in 423 grams of ethylacetate and recrystallized to obtain a product that exhibits an initial melting point of 90° C.

Acidic Acrylic Polymer

Commercially available from SC Johnson under the designation Joncryl SCX 817.

Carbon Black

Commercially available from Cabot Corp. under the designation Regal 400R.

Barium Sulfate

Commercially available from JM Huber Corp. of Quincy, Ill. under the name "Huberite-1".

Titanium Dioxide

Commercially available from E.I. DuPont de Nemours & Co. under the designation R960.

The samples of the coated articles are prepared by adding the components into a Vitamixer blender with the components used in the smaller amounts added last. The blender is set at high speed and operated at 5 seconds forward and 5 seconds reverse that is repeated twice. This procedure is repeated after allowing the premix to set for about 10 minutes.

The premixed composition is poured into the hopper of an extruder (APV Model 19 PC twin screw extruder with two heating zones) and melt mixed at the indicated zone temperatures (T1 and T2 in °C.) and rpm settings. The extrudate is collected as a ribbon from between chilled pinch rolls.

The cooled ribbon is crushed and placed in a Vitamix blender (no more than ⅓ full) and ground at high speed for 5 seconds forward and 5 seconds reverse that is repeated. This procedure is repeated after allowing the ground composition to set for about 10 minutes. The ground powder is placed in pan sieves on a shaker and a 140 or 170 mesh sieved powder is collected.

The coated samples are obtained by applying the various compositions to grounded steel panels (which have been pre-treated with iron phosphate) by electrostatic spraying using an MPS-1L hand held gun obtained from GEMA Volstatic of Indianapolis, Ind. The coating is cured at 30 minutes at 165° C. and 30 minutes at 185° C. to obtain a cured coating thickness of 2.5 mils. The coated samples are subjected to a 60° gloss test in accordance with ASTM D523. In addition, the samples are tested for impact hardness using Gardner Impact Test, pencil hardness, adhesion using the parallel groove adhesion test of ASTM D3359 and visually examined for smoothness.

The compositions and results are set forth in the following Tables 1–6. In the Tables, the resin components isocyanurate curing agent are expressed in weight percentages with the reactive equivalent fractions being shown in parentheses. The additives and pigments are expressed in parts per hundred of resin (phr) which can be multiplied by 6 to obtain the actual weights used.

To illustrate clear coatings that exhibit low gloss, two formulations have been prepared in accordance with the same general procedure to obtain a cured coating thickness of 2.7 mils. The results of these examples are set forth in Table 7.

TABLE 1

| | Control Example 1* | Control Example 2 |
|---|---|---|
| | Color: | |
| | White Amounts | Black Amounts |
| Components: | | |
| Acrylic Copolymer 1 | 22.5 (0.75) | 22.1 (0.75) |
| Acrylic Copolymer 2 | 7.5 (0.25) | 7.4 (0.25) |
| Aromatic Polyester | 70.0 (0.87) | 70.5 (1.0) |
| Titanium Dioxide | 25.0 | — |
| Barium Sulfate | — | 25.0 |

TABLE 1-continued

|  | Control Example 1* | Control Example 2 |
|---|---|---|
|  | Color: | |
|  | White Amounts | Black Amounts |
| Carbon Black | — | 3.75 |
| Tinuvin 900 | — | 1.50 |
| Tinuvin 144 | — | 1.00 |
| Modaflow Powder III | 1.47 | 2.31 |
| Benzoin | — | 1.00 |
| Extruder Conditions: | | |
| T1/T2/rpm | 112/70/320 | 112/70/320 |
| Properties: | | |
| 60 Gloss | 34 | 70 |
| Impact, in-lb | 30 | 60 |
| Hardness | H | F |
| Adhesion | 5B | 5B |
| Smoothness | Very Good | Good |

*Contains 1.0% of catalyst N-alkyl imidazole sold under the name Curezol C17Z from Air Products Corp.

TABLE 2

|  | Example 1 | Example 2 |
|---|---|---|
|  | Color: | |
|  | White Amounts | White Amounts |
| Components: | | |
| Acrylic Copolymer 1 | 32.5 (0.75) | 26.93 (0.75) |
| Acrylic Copolymer 2 | 10.8 (0.25) | 8.98 (0.25) |
| Aromatic Polyester | 51.9 (0.50) | 60.21 (0.70) |
| CEI | 4.80 (0.50) | — |
| THEI-SUC | — | 3.88 (0.30) |
| Titanium Dioxide | 25.0 | 25.0 |
| Tinuvin 900 | 1.50 | 1.50 |
| Tinuvin 144 | 1.00 | 1.00 |
| Modaflow Powder III | 2.31 | 2.31 |
| Benzoin | 1.00 | 1.00 |
| Extruder Conditions: | | |
| T1/T2/rpm | 112/75/320 | 95/75/320 |
| Properties: | | |
| 60 Gloss | 20 | 13 |
| Impact, in-lb | 30 | 50 |
| Hardness | H+ | H– |
| Adhesion | 5B | 5B |
| Smoothness | Good | Excellent |

TABLE 3

|  | Example 3 | Example 4 | Example 5 |
|---|---|---|---|
|  | Color: | | |
|  | White Amounts | White Amounts | White Amounts |
| Components | | | |
| Acrylic Copolymer 1 | 26.93 (0.75) | 24.3 (0.75) | 31.92 (0.75) |
| Acrylic Copolymer 2 | 8.98 (0.25) | 8.08 (0.25) | 10.64 (0.25) |
| Aromatic Polyester | 60.2 (0.70) | 65.9 (0.85) | 51.0 (0.50) |
| CEI | — | — | 1.88 (0.20) |
| CEI-Salt | 3.85 (0.30) | 1.75 (0.15) | 4.57 (0.30) |
| Titanium Dioxide | 25.0 | 25.0 | 25.0 |
| Tinuvin 900 | 1.50 | 1.50 | 1.50 |
| Tinuvin 144 | 1.00 | 1.00 | 1.00 |
| Modaflow Powder III | 2.31 | 2.31 | 2.31 |
| Benzoin | 1.00 | 1.00 | 1.00 |
| Extruder Conditions: | | | |
| T1/T2/rpm | 95/75/320 | 95/75/320 | 95/75/320 |
| Properties: | | | |
| 60 Gloss | 9 | 24 | 17 |
| Impact, in-lb | 40 | 40 | 60 |
| Hardness | H+ | H– | H |
| Adhesion | 5B | 5B | 5B |
| Smoothness | Excellent | Excellent | Good |

TABLE 4

|  | Example 6 | Example 7 | Example 8 |
|---|---|---|---|
|  | Color: | | |
|  | Black | White | White |
| Components: | | | |
| Acrylic Copolymer 1 | 35.9 (1.00) | — | — |
| Acrylic Copolymer 3 | — | 41.6 (1.00) | 30.3 (0.665) |
| Acrylic Copolymer 4 | — | — | 5.58 (0.335) |
| Aromatic Polyester | 60.25 (0.70) | 54.9 (0.7) | 60.24 (0.70) |
| CEI-Salt | 3.85 (0.30) | 3.52 (0.30) | 3.85 (0.30) |
| Titanium Dioxide | — | 25.0 | 25.0 |
| Barium Sulfate | 25.0 | — | — |
| Carbon Black | 3.75 | — | — |
| Tinuvin 900 | 1.50 | 1.50 | 1.50 |
| Tinuvin 144 | 1.00 | 1.00 | 1.00 |
| Modaflow Powder III | 2.31 | 2.31 | 2.31 |
| Benzoin | 1.00 | 1.00 | 1.00 |
| Extruder Conditions: | | | |
| T1/T2/rpm | 95/75/320 | 95/75/320 | 95/75/320 |
| Properties: | | | |
| 60 Gloss | 11 | 5 | 24 |
| Impact, in-lb | 50 | 10 | 50 |
| Hardness | H | H | H |
| Adhesion | 5B | 5B | 5B |
| Smoothness | Excellent | Excellent | Excellent |

TABLE 5

|  | Example 9 |
|---|---|
|  | Color: White |
| Components: | |
| Acrylic Copolymer 1 | 27.38 (0.75) |
| Acrylic Copolymer 2 | 9.13 (0.25) |
| Aromatic Polyester | 52.05 (0.595) |
| Acidic Acrylic Polymer | 7.52 (0.105) |
| CEI-Salt | 3.92 (0.30) |
| KM-334 | |
| Titanium Dioxide | 25.0 |
| Tinuvin 900 | 1.50 |
| Tinuvin 144 | 1.00 |
| Modaflow Powder III | 2.31 |
| Benzoin | 1.00 |
| Extruder Conditions: | |
| T1/T2/rpm | 95/75/320 |

TABLE 5-continued

|  | Example 9<br>Color:<br>White |
|---|---|
| Properties: | |
| 60 Gloss | 9 |
| Impact, in-lb | 30 |
| Hardness | H+ |
| Adhesion | 5B |
| Smoothness | Excellent |

TABLE 6

|  | Example 10<br>Color:<br>Black<br>Amounts |
|---|---|
| Components: | |
| Acrylic Copolymer 1 | 26.93 (0.75) |
| Acrylic Copolymer 2 | 8.98 (0.25) |
| Aromatic Polyester | 60.24 (0.70) |
| CEI-Salt | 3.85 (0.30) |
| Barium Sulfate | 25 |
| Carbon Black | 3.75 |
| Tinuvin 900 | 1.50 |
| Tinuvin 144 | 1.00 |
| Modaflow Powder III | 2.31 |
| Benzoin | 1.00 |
| Extruder Conditions: | |
| T1/T2/rpm | 95/75/320 |
| Properties: | |
| 60 Gloss | 7 |
| Impact, in-lb | 50 |
| Hardness | H- |
| Adhesion | 5B |
| Smoothness | Excellent |

TABLE 7

|  | Color: | |
|---|---|---|
|  | Clear<br>Amounts: | Clear<br>Amounts: |
| Components: | | |
| Acrylic Copolymer 1 | 41.49 (1.27) | 35.84 (1.00) |
| Aromatic Polyester | 48.54 (0.60) | 53.22 (0.60) |
| CEI-salt | 3.51 (0.30) | 3.85 (0.30) |
| Aliphatic Polyester | 6.46 (0.1) | 7.09 (0.1) |
| Tinuvin 900 | 1.50 | 1.50 |
| Tinuvin 144 | 1.00 | 1.00 |
| Modaflow III | 2.31 | 2.31 |
| Benzoin | 1.00 | 1.00 |
| Extruder Conditions: | | |
| T1/T2/rpm | 85/65/320 | 85/65/320 |
| Properties: | | |
| 60 Gloss | 8 | 11 |
| Impact, in-lb | 40 | 30* |
| Hardness | H- | F+ |
| Adhesion | 5B | 5B |
| Smoothness | Excellent | Excellent |

*Test on 2.7 mil

Although the present invention has been described with reference to certain preferred embodiments, it is apparent that modifications and variations thereof may be made by those skilled in the art without departing from the scope of this invention as defined by the following claims:

We claim:

1. A coating composition that provides a 60° gloss of less than about 60 upon curing comprising:
   a) a glycidyl group-containing acrylic copolymer prepared from at least one ethylenically unsaturated compound as a copolymerizable monomer;
   b) an aromatic polyester which contains carboxyl groups; and
   c) an isocyanurate curing agent having the formula:

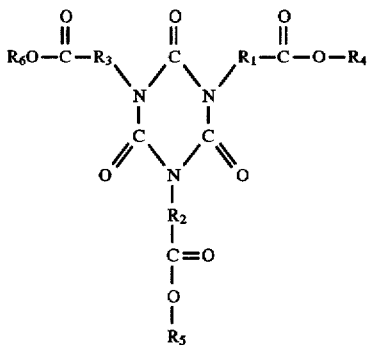

wherein $R_1$–$R_3$ are independently selected from the group consisting of divalent alkylene groups of 1 to 18 carbon atoms and divalent groups of 3 to 21 carbon atoms and containing an ester linkage, and $R_4$–$R_6$ are independently selected from the group consisting of H, organic salt groups, alkyl groups of 1 to 20 carbon atoms and $C(O)R_7$ wherein $R_7$ is an alkyl group of 1 to 22 carbon atoms.

2. The coating composition of claim 1 wherein the glycidyl group-containing acrylic copolymer is the reaction product of at least one of glycidyl acrylate and glycidyl methacrylate and at least one monomer selected from the group consisting of styrene, methyl acrylate, methyl methacrylate, n-butyl acrylate and n-butyl methacrylate.

3. The coating composition of claim 2 wherein the glycidyl group-containing acrylic copolymer is the reaction product of glycidyl methacrylate, styrene, methyl methacrylate and n-butyl acrylate or n-butyl methacrylate.

4. The coating composition of claim 1 wherein the glycidyl group-containing acrylic copolymer has a weight average molecular weight of from about 2,000 to about 20,000.

5. The coating composition of claim 1 wherein the glycidyl group-containing acrylic copolymer has a weight average molecular weight of from about 3,000 to about 12,000.

6. The coating composition of claim 1 wherein the glycidyl-group-containing acrylic copolymer is present in an amount in the range of from about 20 to about 80% by weight of the coating composition.

7. The coating composition of claim 1 wherein the glycidyl-group-containing acrylic copolymer is present in an amount in the range of from about 25 to about 65% by weight of the coating composition.

8. The coating composition of claim 1 wherein the aromatic polyester has an acid number of from about 10 to about 300 mg KOH/g.

9. The coating composition of claim 1 wherein the aromatic polyester has an acid number of from about 20 to about 150 mg KOH/g.

10. The coating composition of claim 1 wherein the aromatic polyester has a weight average molecular weight of from about 2,000 to about 20,000.

11. The coating composition of claim 1 wherein the aromatic polyester has a weight average molecular weight of from about 3,000 to about 12,000.

12. The coating composition of claim 1 wherein the aromatic polyester is present in an amount in the range of from about 20 to about 80% by weight of the coating composition.

13. The coating composition of claim 1 wherein the aromatic polyester is present in an amount in the range of from about 40 to about 75% by weight of the coating composition.

14. The coating composition of claim 1 wherein the aromatic polyester is prepared from a mixture of aromatic polycarboxylic acid and non-aromatic polycarboxylic acid that is reacted with at least one polyhydroxy compound.

15. The coating composition of claim 1 wherein $R_1$–$R_3$ are ethylene groups.

16. The coating composition of claim 1 wherein $R_4$–$R_6$ are H.

17. The coating composition of claim 1 wherein at least one of $R_4$–$R_6$ is an organic salt group.

18. The coating composition of claim 17 wherein the organic salt group is formed from dimethyldodecylamine.

19. The coating composition of claim 1 wherein the isocyanurate curing agent is the reaction product of a trihydroxy isocyanurate compound and a carboxylic anhydride.

20. The coating composition of claim 19 wherein the carboxylic anhydride is succinic acid anhydride.

21. The coating composition of claim 1 wherein at least one of $R_4$–$R_6$ is $C(O)R_7$.

22. The coating composition of claim 21 wherein $C(O)R_7$ is acetyl.

23. The coating composition of claim 22 wherein $R_1$–$R_3$ are divalent alkylene groups of 1 to 18 carbon atoms.

24. The coating compositions of claim 23 wherein $R_1$–$R_3$ are ethylene.

25. The coating composition of claim 1 wherein the isocyanurate curing agent is present in an amount in the range of from about 1 to about 30% by weight of the coating composition.

26. The coating composition of claim 1 wherein the isocyanurate curing agent is present in an amount in the range of from about 3 to about 15% by weight of the coating composition.

27. The coating composition of claim 1 wherein the composition further comprises pigment in an amount ranging from about 5 to about 60% by weight of the total coating composition.

28. The coating composition of claim 27 the pigment is selected from the group consisting of carbon black, titanium dioxide, barium sulfate, iron oxides, chromium oxide, talcs, clays, silica, calcium carbonate, phthalocyanines, benzimidazolones, quinacridones, dioxazines, isoindolinones, disazos, pyrazalones, diarylides, dianisidines and mixtures thereof.

29. The coating composition of claim 1 wherein the cured composition has a 60° gloss of less than about 50.

30. The coating composition of claim 1 wherein the cured composition has a 60° gloss of from 0 to about 10.

* * * * *